United States Patent
Stephens, Jr.

(10) Patent No.: US 8,380,654 B2
(45) Date of Patent: Feb. 19, 2013

(54) GENERAL MARKET PREDICTION USING POSITION SPECIFICATION LANGUAGE

(75) Inventor: James H. Stephens, Jr., Austin, TX (US)

(73) Assignee: Morphism LLC, Austin, TX (US)

( * ) Notice: Subject to any disclaimer, the term of this patent is extended or adjusted under 35 U.S.C. 154(b) by 303 days.

(21) Appl. No.: 12/961,233

(22) Filed: Dec. 6, 2010

(65) Prior Publication Data

US 2011/0137848 A1    Jun. 9, 2011

Related U.S. Application Data

(60) Provisional application No. 61/267,151, filed on Dec. 7, 2009.

(51) Int. Cl.
*G06F 9/44* (2006.01)
*G06F 21/00* (2006.01)
*G06G 7/48* (2006.01)
*G06Q 10/00* (2006.01)

(52) U.S. Cl. ............... 706/52; 703/6; 717/100; 705/1.1; 705/50

(58) Field of Classification Search ............ None
See application file for complete search history.

(56) References Cited

U.S. PATENT DOCUMENTS 8,307,372 B2* 11/2012 Feblowitz et al. ........... 719/310
2007/0244777 A1* 10/2007 Torre et al. .................. 705/35

* cited by examiner

*Primary Examiner* — Alan Chen
(74) *Attorney, Agent, or Firm* — Hamilton & Terrile, LLP; Robert W. Holland

(57) ABSTRACT

Methods evaluating propositions about timeseries are provided. A service accepts a proposition about one or more timeseries, and the service monitors those timeseries. A proposition can reference multiple timeseries with different time intervals and different units. When new data is available, the service evaluates the proposition to determine if the proposition is true, false, or neither. The service automatically performs unit conversions and selects relevant, previously observed values before evaluating a proposition when new data is available.

1 Claim, 2 Drawing Sheets

GENERAL MARKET PREDICTION USING POSITION SPECIFICATION LANGUAGE

CROSS REFERENCE TO RELATED APPLICATION

This application claims priority to U.S. Provisional Patent Application No. 61/267,151, filed Dec. 7, 2009, and entitled "General Prediction Market", the entire disclosure of which is incorporated herein by reference.

BACKGROUND OF THE INVENTION

1. Field of the Invention

The present invention relates to evaluating propositions. More specifically, the invention relates to receiving, validating and evaluating statements about timeseries data.

2. Description of the Related Art

Several Web sites provide some form of "prediction market"[1]. Examples include Iowa Electronic Markets (IEM), Predictify.com, MyPrognostic.com, InTrade.com, Hubdub.com, Pickum.com, BetFair.com, Intrade.com, iPredicts.com, Nostradamical.com, and Dotblu.com. Site editors or in some cases users themselves can publish specifications for events, propositions, or questions, and then users can take positions with respect to these instruments. A wide variety of topics is available for predictions. In some cases, a user can associate an amount to wager or specify a probability for some event. A user's prediction history—his record—is typically available to the public. In some cases, a primary goal of these services is to aggregate users' predictions to determine the collective view.

[1] http://en.wikipedia.org/wiki/Prediction_market

SUMMARY OF THE INVENTION

In this discussion, the term "position" is used generically to refer to a user's reported belief about some proposition or prediction with respect to some variable(s). For example, a bet that the stock price of company X will exceed $10 per share is a position on the value of the company's stock price. The statement that the chance of rain tomorrow in Austin, Tex. is 30% is also a position, and the variable in question is "rain in Austin, Tex.". A variable can be a scalar, boolean, categorical, or other type. The variable is typically observed, gathered, collected, or measured periodically.

In the related art, a user typically cannot formulate an arbitrary position with respect to one or more variables. Instead, a user must select from predefined position schemata, such as x>y, where x is a variable and y is a user-supplied parameter. For example, in the related art, a user could take a position on a future level of the S&P 500 stock index ("SPX"). Say SPX>1100. Or the user could take a position on a future price of a share of stock in company X ("X"). Now consider the belief that X will outperform SPX (in a given period). Represent that belief by $\Delta X > \Delta SPX$, where $\Delta(x)$ is the percentage change operator $(x_1-x_0)/x_0$. In other words, the position is that the percentage change in X will exceed the percentage change in SPX. This type of position is appealing in financial markets. A user might not want to assume broad market risk while wishing to take on some relative risk. In the related art, unless such a position schema is already offered by the prediction market, the user is unable to take such a position.

As another example, consider the proposition that some variable x will exceed another y by 11 or more. In other words $x-y \geq 11$. Such a "spread" position is an instance of a very common position schema in sports, and services that focus on sports wagers offer such position schemata. Such schemata have been defined in advance by the service. A user cannot take an arbitrary position defined by an arbitrary expression that he provides. Additionally, in many cases, a user cannot take a position that references multiple variables—especially those with different intervals.

In some instances, a user might be able to synthesize or approximate an complex position by taking two or more simple positions simultaneously. For example, a user can approximate the "outperform" position by betting that (1) X will increase and that (2) SPX will decrease. However, such synthetic positions typically suffer from several problems. The synthetic position might not replicate the desired position exactly, the costs of multiple constituent positions may be prohibitive or at least troublesome, and a user's actual, net position can become opaque to other users. (Each of these problems arise in real over-the-counter derivative contracts.)

While current prediction markets have offered a very broad range of positions in many topics (including finance, economics, current events, technology, and even weather), none has offered a general facility for taking arbitrary, well-defined, automatically-evaluable positions with respect to available underlying variables. In this description, such positions are called "complex". In other words, the related art has excelled at breadth while failing to increase expressiveness much.

Though some current prediction markets allow users themselves to specify variables, questions, or propositions, the related art does not offer a convenient way to evaluate positions with respect to those user-submitted entities without human intervention. For example, a user might offer the proposition that the New York Yankees will win the 2009 World Series, but a person would have to determine if that is what actually happened. In contrast, many positions with respect to certain variables can be evaluated automatically. For example, the position that Google's stock price will close below $500 on Jan. 1, 2010 can be determined automatically by check a (or the) authoritative source for that variable. Specifying a process for automatically obtaining new kinds of variables, such as rainfall in Austin, Tex. on a given day, is not always easy. Generally speaking, such a process requires identifying an authoritative source, obtaining raw data from that source, parsing that data, extracting a relevant subset of that data, and transforming the result into the required format.

Therefore there is a need for a facility that provides for rich positions of arbitrary and complex yet well-defined specifications that can be evaluated automatically.

Many technical and usability challenges arise from allowing arbitrary positions. Position specification requires a language for the specifications, and the service must be able to evaluate those specifications safely and efficiently. If the language is not very expressive, then the motivating benefits will be limited or unrealized. Some languages or language implementations may be too complex to use or to evaluate safely. When a service allows arbitrary positions, users will inevitably provide syntactically incorrect or otherwise error-prone position specifications. In these cases, the service should detect, handle, and report these problems accordingly.

Additionally, allowing propositions that refer to multiple variables (say both X and SPX in the "outperform" example above) introduces several technical challenges. For example, when are those two variables observed for a given evaluation of the proposition? Alternately, when is a position evaluated? One variable might change daily while the other might change monthly. Units can also differ.

Furthermore, complex positions introduce a kind of opacity. In the related art, positions are evaluated and/or aggregated to provide estimates representing the views of a set of users. "60% of our users claim that company X's share price will fall below $1 by the end of the year." However, with complex positions, basic aggregation techniques do not work. Consider an example where many users have taken an "outperform" position on X. Without additional effort, those positions are silent on X's absolute variable. Therefore complex positions oppose many prediction markets' goals of reporting aggregate views on events.

The system described herein fulfills the need for a prediction market with arbitrary, well-defined positions while addressing these and other challenges.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In the description that follows, the present invention will be described in reference to embodiments that support complex positions in a general prediction market. More specifically, the embodiments will be described in reference to using a position specification language and a variable specification language in order to specify and evaluate complex positions. However, the scope of the invention is not limited to any particular environment, application, or specific implementation. Therefore, the description of the embodiments that follows is for purposes of illustration and not limitation.

Figure 1:
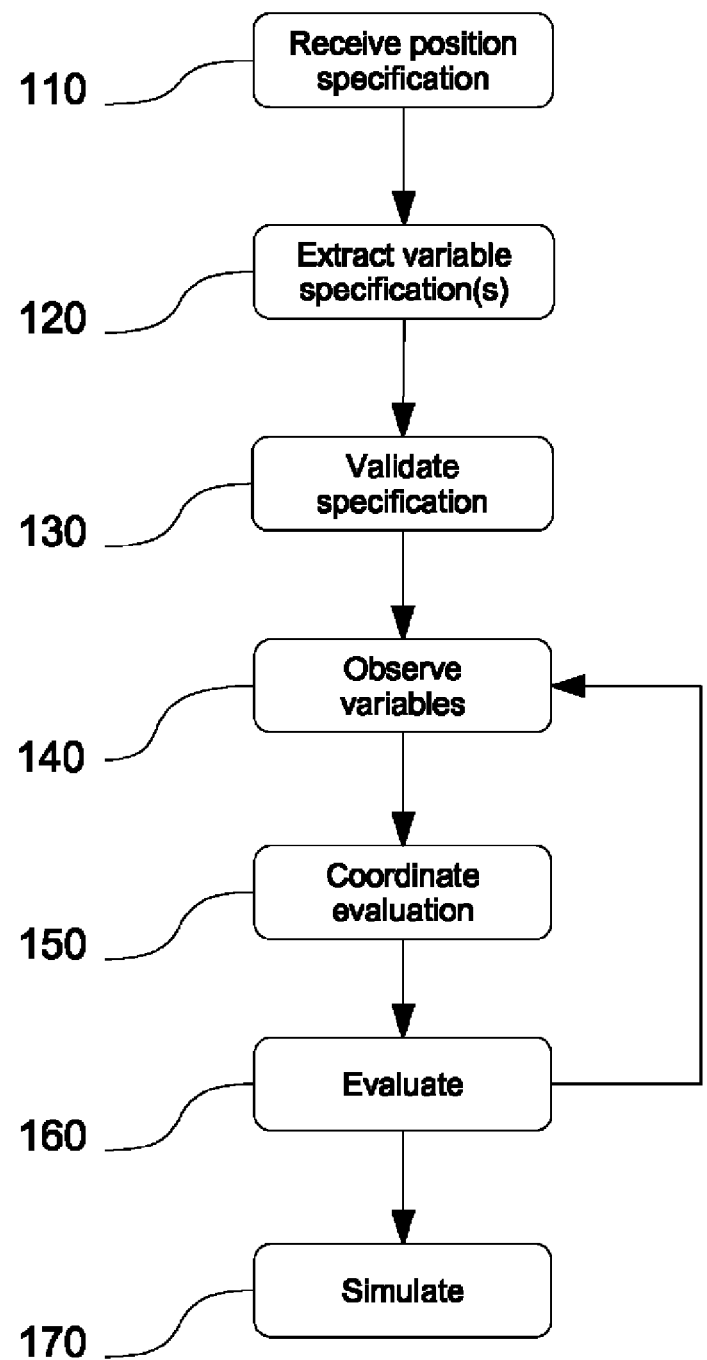
FIG. 1 is a flow chart illustrating steps performed for processing complex positions.

FIG. 1 is a flow chart illustrating steps performed for complex position processing. In step 110, a user specifies a position using a position specification language ("PSL"), which typically supports mathematical operators and relations, conditionals, and a library of predefined functions. Additionally the PSL can provide variables, looping constructs, and other features. A position specification refers to one or more variable specifications, each of which identifies some variable of interest (e.g., the closing price of some company's common stock).

For example, the position specification "$X.stock.close>10" might mean "company X's stock price will close above $10". In this example, "$X.stock.close" is a variable specification. For another example, the position specification "$Y.score>$X.score+11" could mean "Team Y's score is more than 11 points higher than Team Z's score." Another example: "delta($X)>delta($SPX)" could mean that X's stock will outperform the S&P 500 index. In this example, "delta" is function provided by a library. A more aggressive position "delta($X)>2*delta($Y)" could be interpreted as "X will outperform Y by factor of two".

With a sufficiently expressive PSL, a user can construct any arbitrary yet objective and computable position—given the required input variables.

For some embodiments, ECMAScript, perhaps modified and/or constrained, is a suitable PSL. As part of the validation or prior to it, component 120 extracts and resolves variable specifications from the position specification.

In step 120, variable specifications are extracted from the position specification. As stated previously, a typical position references one or more variables via variable specifications. The syntax for a variable specification varies with the PSL. For clarity, we say the language for specifying variables is the variable specification language ("VSL"), which is in a sense a sublanguage of the PSL. In some embodiments, there is no VSL distinct from the PSL. In certain embodiments using ECMAScript as a PSL, VSL syntax is compatible with the PSL in the sense that PSL identifiers can be used as part of the VSL. Unlike some PSL's, most VSL's are fairly simple— though the method for resolving variables from a specification might not be. For example, the grammar for a simple VSL might consist of $token.field, where token matches the regular expression "[a-zA-Z][a-zA-Z0-9]*"; field is one of "open", "close", "high", "low"; and "$" and "." are just those literal characters. In this simple example, the "$" flag, perhaps via a user-supplied default, indicates the stock price of the company whose ticker symbol is token. So in this example "$GOOG.open" would mean "opening price of Google's common stock". A more general VSL can allow for arbitrary computation to obtain the desired variable. For example, "$('FRED', 'NAPMBI')" could refer to the St. Louis Federal Reserve Bank's ISM Manufacturing Backlog of Orders Index. More generally, a variable specification can include a source, series identifier or search string, and an offset or index specification.

The syntax for tokens can be generalized to arbitrary expressions which evaluate to an object or other construct that has accessors to provide the requested datum. Note that this generality allows an expression to return or otherwise consider a value previously seen in a timeseries of values. In particular, the expression syntax and semantics could allow access to a the $i$th point in some series, where the index $i$ could be determined by a positive integer, a negative integer (for an offset starting at the end), a time or date specification, or other data. For example, "$('FRED', 'NAPMBI')['2010-08']" and "$('FRED', NAPMBI)[−2]" might both refer to the August 2010 value for that timeseries. Metadata can include the date the value was reported or obtained, an estimate of the error associated with the value, an indication of the sampling techniques used (if any), footnotes or similar annotations, units (if units changed), and other similar data. In this manner, a variable specification can itself evaluate to a structure that represents complete information for a timeseries.

After obtaining the variable specification, step 120 resolves, maps, or evaluates those specifications to variable entities, which can be automatically observed in order to evaluate propositions that reference them. Diagnostics for an invalid position specification are reported to the user.

In step 130, the position specification (along with its variable specifications if necessary) is validated syntactically and, optionally, logically. Problems with syntax are typically reported to the user. Logical validation, if any, can proceed by observing the required variables and attempting to evaluate the position using those values. Some logical problems, such as a division by zero or perhaps a likely infinite loop indicated by a long-running evaluation, can sometimes be detected and reported. Of course, if the PSL is expressive enough, not all such problems are detectable. A position specification which does not pass these validation tests can be marked as invalid and treated appropriately.

Step 140 proceeds by observing variables to obtain actual variable data. For example, observing X's stock price can consist of automatically querying, parsing, and validating an authoritative online source. This step typically also occurs during validation as well.

Step 150 coordinates the evaluation of positions based on available observations of variables. For single-variable propositions—those referencing only one variable—this step can be fairly simple. When a new variable is observed, positions that reference that variable only can be evaluated immediately.

When a position references multiple variables, the coordination logic can become more complicated. Two variables might not be observed on the same schedule, nor do they have to have the same horizon. For example, a mutual fund net asset variable might be reported only after markets are closed whereas a stock price is observable almost continuously during market hours. For another example, a position might reference two economic variables, one reported monthly and the other quarterly. In cases where multiple variables differ in schedule, horizon, or similar characteristics, several methods for coordinating position evaluation are possible. One approach is to evaluate a proposition when a value for each variable is available and variable with longest horizon covers the horizons of the other variables.

In particular, the following system can be used to guide evaluation of statements that reference multiple variables with different intervals or other coverage periods. Let $X=\{x_i\}$ be a timeseries, where the timestamp for each datum is indexed by $_i$. Let $H:X \to <t_0,t_1>$ be a horizon function that maps a point to a pair that represent the interval of time that that the point represents. Say an expression E references multiple timeseries $\{X_j\}$. When a new value $x_{j,i}$ arrives in a timeseries $X_j$, gather the set of points from other series that have horizons that intersect with $x_{j,i}$'s. Then construct a tuple $<x_{0,i}, \ldots, x_{n,i}>$ with a value $x_{j,i}$ for each series $X_j$ such that each value's horizons intersect. For each tuple, bind the values to the variables referenced in E. Finally evaluate E with those bindings.

In step 160, a position with the requisite values, as determined by the previous step, is evaluated. The position specification, with variable specifications replaced (or called, macro expanded, or such) with their respective values, is evaluated using a PSL evaluator (an interpreter, compiler and runtime, byte-code compiler and virtual machine, or other similar facilities). This evaluation is typically performed in a virtual sandbox and under tight constraints to prevent a rogue specification from damaging the system. For example, for a given evaluation, memory, CPU, and other computational resources are restricted to prevent excessive resource consumption during evaluation. If the component has to terminate an evaluation before it completes, an error state is associated with the position. The result of the expression should either be a boolean value, missing value, or an error.

This evaluation occurs for each tuple of variable values until the position is either satisfied or rejected. If the position is not satisfied or rejected after evaluations with all tuples, the position stays pending to await a subsequent variable observation.

During this step or prior to this step, variable values can be converted based on their units and as required by the position specification. In particular, a position specification can imply a unit conversion is required. For example, "X<Y", when X is given in thousands of dollars and Y in millions of dollars, implies that the raw scalar values should be converted to a common unit before the expression is evaluated.

Some embodiments allow propositions to be qualified as always having to be true for the position itself to obtain. In these cases such a prediction can only determined to be true at the end of its duration, yet such a proposition could be found to be false at any time. For example, the proposition that "Google stock price always closes about $500 in 2009-Q4" can only be decided to be true after the last business day of 2009. In contrast, some positions can be decided true or false at any time.

Step 170, which is optional, performs an analysis on both simple and complex positions in order to report aggregate implied views on single variables. Note that step 170 can use steps 150 and 160 to coordinate and perform position evaluation based on simulated variable observations.

Some prediction markets seek to provide a collective view of a variable, but complex positions might not be amenable to simple aggregation—as discussed previously. Therefore some embodiments perform simulations, where unobserved variable values are simulated based on various factors, including the histories of those and other values, the track record of users' predictions, and other data. If many users think that X will outperform SPX and if many users think that SPX will increase, then a simulation or other analysis can reveal that the user community as whole thinks that X will increase as well. Obviously such conclusions can be perilous yet hopefully still logical.

Typically historical observations are used to generate a model or similar structure from which samples can be taken. Based on statistics from this simulation, this step can estimate the probability that a prediction will be accurate.

Figure 2:
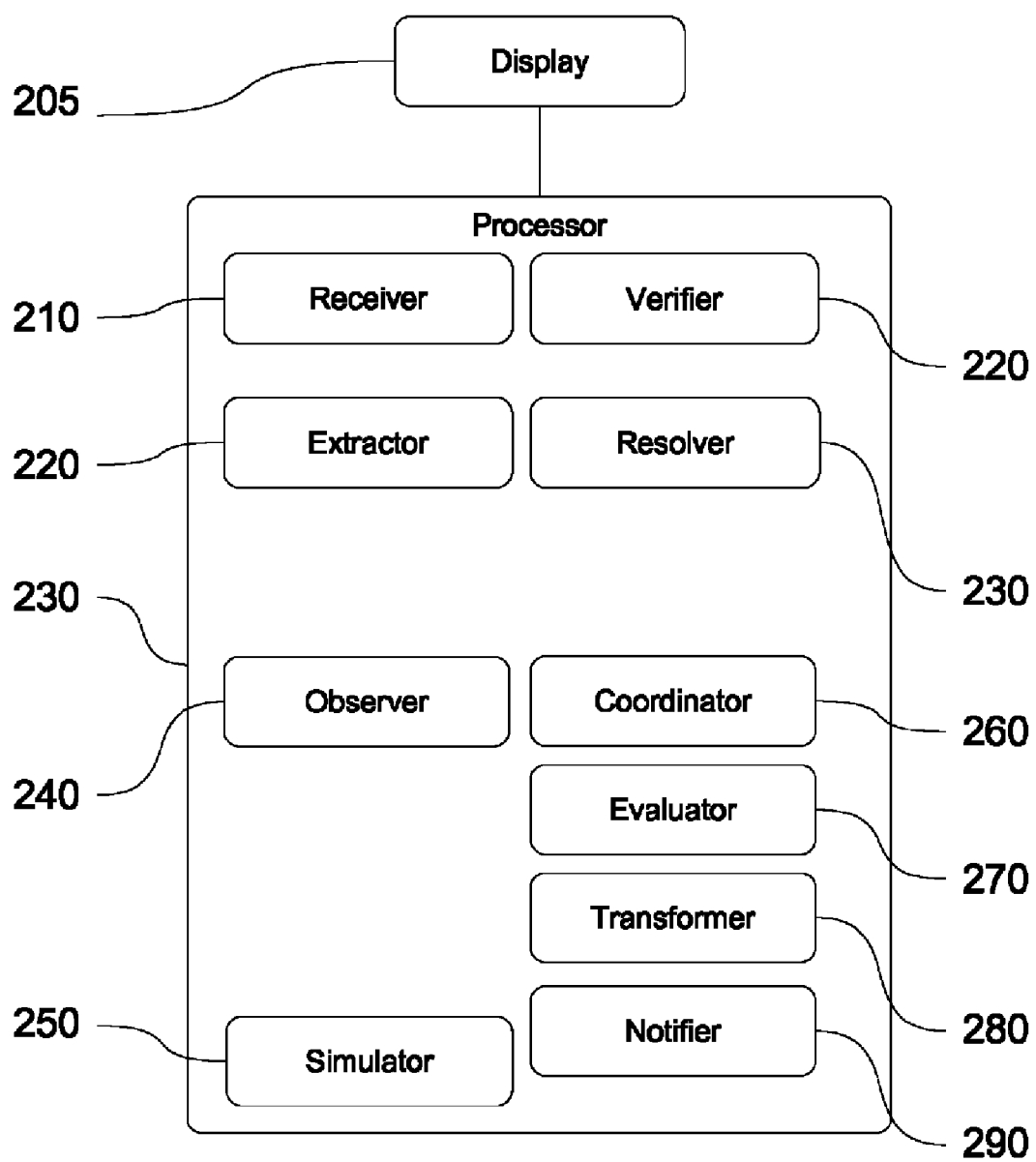
FIG. 2 is a flow chart depicting a system for position processing, transforming, and notification.

FIG. 2 is a depiction of a system for position processing, transforming, and notification. A receiver 210 receives a position specified by a position specification in a position specification language. Verifier 220 optionally verifies a digital signature of the position that the submitter of the position may have provided with the position. This signature can be used by third parties to verify that the submitter submitted the specified position at the stated time. After receiving the position, an extractor 220 extracts one or more variable specifications from the position specification in a variable specification language, and resolver 230 resolves each variable specification by determining source, series, and index data to obtain a function to obtain value with zero or more associated units. Note that the resolver's actions need not be a simple table look-up. Multiple data structures and associated actions may be used. Given variable specifications, observer 240 observes values using variable functions for variables that are ready to be observed. Coordinator 260 coordinates the evaluation of the position. Typically this coordination proceeds by generating a sequence of tuples of values for each value such that the horizons of each tuple value intersect with all other values in that tuple; however, other embodiments that select variable values are possible. Evaluator 270 evaluates the position specification for until the position is satisfied or rejected. In a typical embodiment, this evaluation relates each variable specification to its corresponding tuple value, which is converted to required units as implied by the position specification. Based on historical observations, given models, or a combination, simulator 250, which is optional, generates synthetic variable observations. These observations can be used to estimate the probability of the position obtaining based on these simulated future variable observations. After evaluation, transformer 280 transforms a representation of the position to reflect the result of the evaluation. For example, display 205 associated with processor 230 can present a graphical representation of the change in a position's state. In addition or alternately, a certificate can be printed. One type of certificate represents that the prediction obtained, and another type of certificate represents that the prediction was false. Finally, an optional notifier 290 can notify interested parties, including the submitter of the position, of a transformed position state. Notification can take many forms, including but not limited to email, physically mailing, electronic funds transfer, or instant messaging that notifies the position's submitter of a change in position state.

The figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. Embodiments were chosen and described in order to best explain the principles of the invention and the practical application, and to enable others of skill in the art to understand the invention for various embodiments with various modifications as are suited to the particular use contemplated.

What is claimed is:

1. A method for automatic timeseries prediction evaluation using an information system, the method comprising:
    receiving a position specified by a position specification in a position specification language;
    verifying a digital signature of the position;
    extracting multiple variable specifications from the position specification in a variable specification language;
    resolving each variable specification by resolving source, series, and index data to obtain a function to obtain a value with zero or more associated units;
    observing each variable using the function;
    simulating future variable observations and estimating the probability of the position obtaining based on the simulated future variable observations, wherein samples are obtained from models based on historical variable observations;
    coordinating an evaluation of the position by generating a sequence of tuples of values for each value such that the horizons of each tuple value intersect with all other values in that tuple;
    evaluating the position specification for each tuple until the position is satisfied or rejected, wherein the evaluating relates each variable specification to its corresponding tuple value, which is converted to required units as implied by the position specification;
    transforming a representation of the position to reflect the result of the evaluation; and
    notifying the position's submitter of a change in position state.

* * * * *